US 8,622,559 B2

(12) United States Patent
Caballero Tapia

(10) Patent No.: US 8,622,559 B2
(45) Date of Patent: Jan. 7, 2014

(54) MIRROR SUPPORT AND DEVICE TO ADJUST THE ORIENTATION OF A MIRROR

(75) Inventor: Moises Caballero Tapia, Barcelona (ES)

(73) Assignee: Fico Mirrors, S.A., Barcelona (ES)

( * ) Notice: Subject to any disclaimer, the term of this patent is extended or adjusted under 35 U.S.C. 154(b) by 83 days.

(21) Appl. No.: 13/445,341

(22) Filed: Apr. 12, 2012

(65) Prior Publication Data

US 2012/0275044 A1 Nov. 1, 2012

(30) Foreign Application Priority Data

Apr. 28, 2011 (EP) .................................... 11382123

(51) Int. Cl.
*G02B 7/182* (2006.01)
(52) U.S. Cl.
USPC ............ 359/872; 359/844; 359/873; 359/874
(58) Field of Classification Search
USPC .......................................... 359/844, 872–874
See application file for complete search history.

(56) References Cited

U.S. PATENT DOCUMENTS

| 3,972,597 | A | * | 8/1976 | Repay et al. ................... 359/874 |
| 4,298,248 | A | * | 11/1981 | Lapp .............................. 248/481 |
| 4,678,295 | A | * | 7/1987 | Fisher ........................... 359/874 |
| 6,032,323 | A | * | 3/2000 | Smith et al. ............... 15/250.003 |
| 2009/0027790 | A1 | * | 1/2009 | Glatter .......................... 359/874 |

FOREIGN PATENT DOCUMENTS

EP 1630040 10/2007

* cited by examiner

*Primary Examiner* — Frank Font
(74) *Attorney, Agent, or Firm* — Banner & Witcoff, Ltd.

(57) ABSTRACT

The present invention relates to a mirror support used in a door mirror vehicle which provides stability and distributes the forces in an uniform way due to two gear knees which are attached to the first ends of two perpendicular arms, a first arm and a second arm setting up a cross and also relates to a device to adjust the orientation of a mirror comprising the clutch mechanism.

14 Claims, 4 Drawing Sheets

MIRROR SUPPORT AND DEVICE TO ADJUST THE ORIENTATION OF A MIRROR

OBJECT OF THE INVENTION

The present invention relates to a mirror support used in a door mirror vehicle which provides stability and distributes the forces in an uniform way.

The present invention also relates to a device to adjust the orientation of a mirror comprising the mirror support described above.

This device comprises two gear knees which are attached to she first ends of two perpendicular arms, a first arm and a second arm setting up a cross which provides stability and distributes the forces to the mirror support. in an uniform way.

BACKGROUND OF THE INVENTION

Devices to adjust the orientation of a mirror are used in a door mirror vehicle. These devices comprise electric motors whose shafts are connected via transmission means with the mirror.

These devices comprise a housing accommodating a first and a second electric motor and a first and a second gear driven by said first and second motor respectively, a mirror support pivot-mounted at the housing in relation to two pivot axles, at which two gear knees are arranged engaging with said gears, a first gear knee engaging with the first gear to pivot the mirror support around a first pivot axle and a second gear knee engaging with the second gear to pivot the mirror support around a second pivot axle.

Each gear knee is fixed arranged directly at the mirror support so the necessary forces to set the orientation of the mirror support are only applied. in two points of the mirror support forming 90° with the center of the mirror support, wherein there isn't any other point in a circumferential arc of 270° in the mirror support receiving the forces from first and second gears.

This configuration distributes forces in a non simetrical way to the mirror support thus increasing the efforts in a specific area of the mirror support and in consecuence causing vibrations in the above mirror support.

Another consecuence of the above configuration is that a manual movement of the door mirror causes worn smooth of the gear knee's teeth since efforts are only absorbed by two points of the mirror support.

In another known configuration forces from gears are applied on four points of the mirror support, three of them equidistantly located in a 90° arc and the other one opposite to the centred point of the three equidistant points.

This configuration also distributes forces in a non-simetrical way to the mirror support since the fixing point of each gear knee is nos connected to the other two points thus increasing the efforts in the specific area of the three equidistant points and in consecuence making convex the mirror support after a high number of working cycles.

Document EP1630040 discloses a mirror support which is arranged in a ball-and-socket joint way to the gears wherein the movement is driven by two gear knees acting in the plane perpendicular to that defined by the mirror in its rest position so there are only three support point non equidistant.

All the above disadvantages are overcome by the present invention that is going to be described in the following sections.

DESCRIPTION OF THE INVENTION

The present invention relates to a mirror support used in a door mirror vehicle which provides stability and distributes the forces in an uniform way.

The invention also relates to a device to adjust the orientation of a mirror comprising the mirror support described above.

The device to adjust the orientation of a mirror comprises a housing accommodating a first and a second electric motor and a first and a second gear driven by said first and second motor respectively.

The first and the second gear are part of a first and a second train gear respectively which also include a first and a second clutch mechanism.

Said device further comprises a mirror support pivot-mounted at the housing in relation to two pivot axles, at which two gear knees are arranged engaging with said train gears, a first gear knee engaging with the first train gear to pivot the mirror support around a first pivot axle and a second gear knee engaging with the second train gear to pivot the mirror support around a second pivot axle.

The device to adjust the orientation of the mirror further comprises a motherboard (PCB) accommodated in the housing and connected to an input connector which transmit the current to the motherboard which in turn transmit the current to the electric motors.

The mirror support comprises a mirror frame where two perpendicular arms are fixed in such a way that the ends of the two perpendicular arms are fixed in four equidistant points with regard to the mirror frame setting up a cross.

Actuating force coming from the gear knees is applied on perpendicular arms, where each arm pivots independently about the central point where they cross.

The orientation of the mirror is established by mirror frame as a consecuence of arrangement of the perpendicular arms, where cross provides stability and distributes the forces in an uniform way.

To summarize, the mirror support of the present. invention comprises a mirror frame which receives an actuating force coming from two gear knees to adjust the orientation of a mirror wherein the two gear knees are attached to two perpendicular arms fixed no the mirror frame in such a way that the ends of the two perpendicular arms are fixed in four equidistant points with regard to the mirror frame setting up a cross.

The invention will be now described more in detail with reference to the accompanying drawings given by way of illustrative and non limiting example, wherein.

Figure 1:
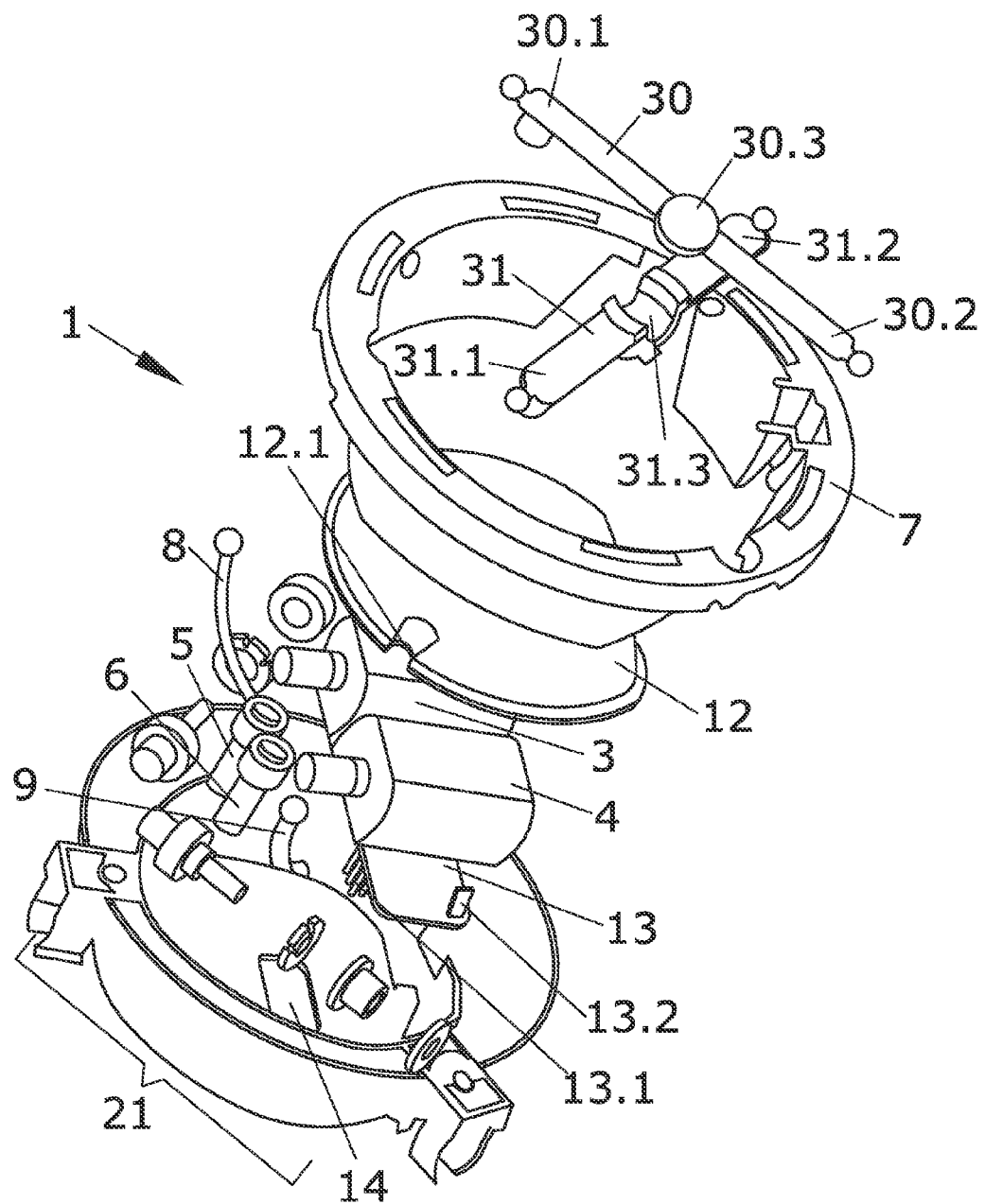
FIG. 1 is an exploded view of the device to adjust the orientation of the mirror of the present invention according to a first preferred embodiment.
Figure 2:
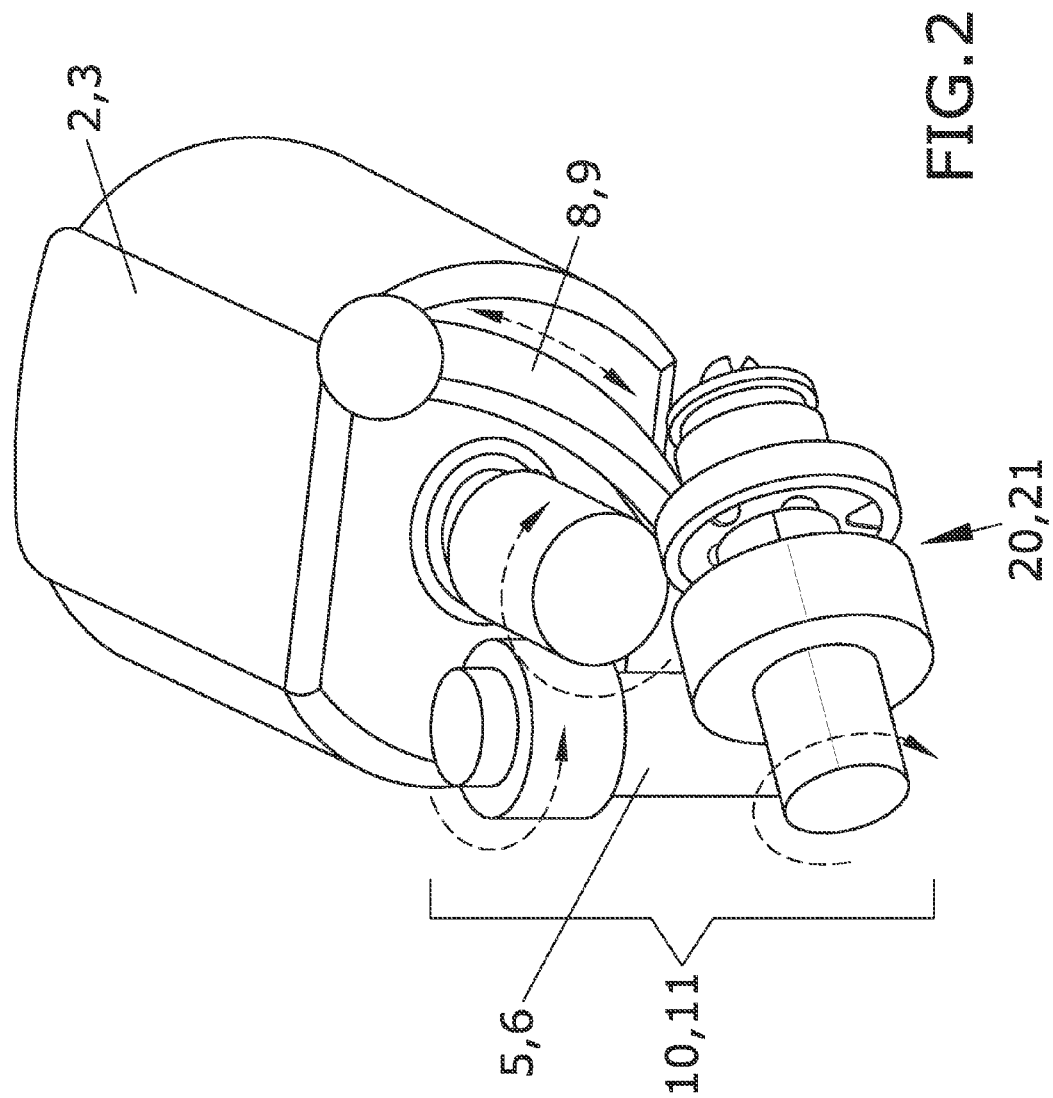
FIG. 2 is a schematic view of a train gear, an electrical motor and a gear knee of the device to adjust the orientation of the mirror according to the present invention.

A device (1) to adjust the orientation of a mirror of a vehicle is shown in FIGS. 1 and 2.

The device (1) comprises a housing (2) accommodating a first and a second DC electric motor (3, 4) and a first and a second helicoidally gear (5, 6) driven by said first and second DC motor (3, 4) respectively.

The first and the second helicoidally gear (5, 6) are part of a first and a second train gear (10, 11) respectively which also include a first and a second clutch mechanism (20, 21).

Said device (1) further comprises a mirror support pivot-mounted at the housing (2) in relation to two pivot axles, at which two circular arc-shaped gear knees (8, 9) are arranged engaging with said train gears (10, 11).

The first gear knee (8) engages with the first train gear (10) to pivot the mirror support (7) around a first pivot axle and the second gear knee (9) engages with the second train gear (11) to pivot the mirror support (7) around a second pivot axle.

A cover (12) situated between the mirror support (7) and the housing (2) overlays the above mechanical and electrical components only allowing the gear knees (8, 9) passing through two holes (12.1) located in the cover (12) to engage with the mirror support.

A backplate arranged on the mirror support supports the mirror by means of a heater or an adhesive (not shown in the Figures).

A motherboard (13) is accommodated onto a window (14) situated in the housing (2) which makes possible the connection with vehicle electrical connections through lower pins (13.1), being connected the motherboard (13) to the DC motors (3, 4) by means of upper pins (13.2).

Figure 3:
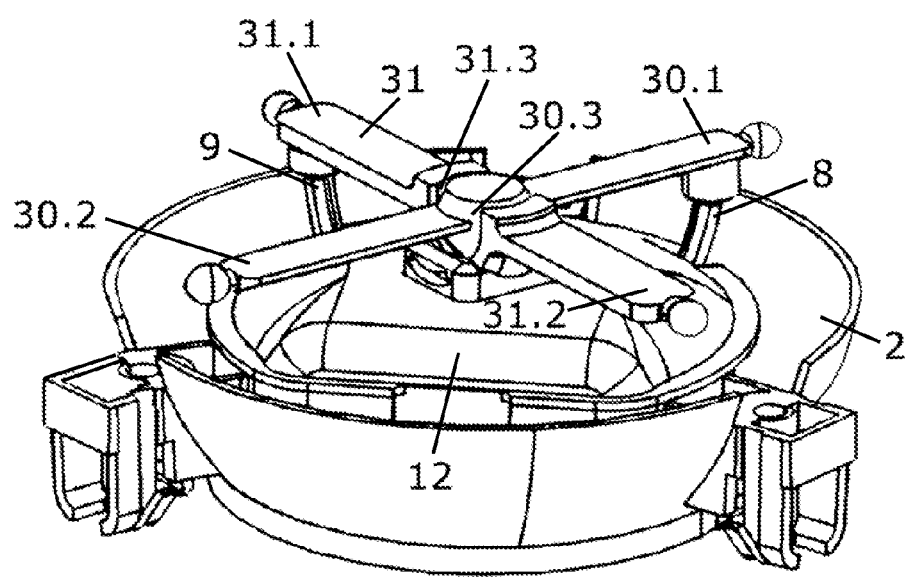
FIG. 3 is a three-point perspective of the first preferred embodiment shown in FIG. 1.

According to FIGS. 1 and 3 a preferred mirror support comprises a mirror frame (7) where two perpendicular arms (30, 31), a first arm (30) and a second arm (31) are fixed setting up a cross, or in other words in such a way that the ends (30.1, 30.2, 31.1, 31.2) of the two perpendicular arms (30, 31), first ends (30.1, 31.1) and second ends (30.2, 31.2) are fixed in our equidistant points with regard to the mirror frame (7).

Each one of the gear knees (8, 9) are attached to first ends (30.1, 31.1) of the two perpendicular arms (30, 31) by means of a ball and socket joint in such a way that the actuating force coming from the gear knees (8, 9) is applied on first ends (30.1. 31.1) of perpendicular arms (30, 31), each arm (30, 31) pivoting independently about the central point where they cross.

In this first preferred embodiment, the central point of the two perpendicular arms (30, 31) is arranged in a ball-and-socket joint (30.3, 31.3) manner wherein the center (30.3) of the first arm (30) is the ball and the center (31.3) of the first arm (30) is the socket, not being limited to other embodiments wherein independent pivot of each arm is mantained.

The orientation of the mirror is established by mirror frame (7) as a consecuence of arrangement of the first ends (30.1, 31.1) and second ends (30.2, 31.2) of perpendicular arms (30, 31), so cross provides stability and distributes the forces in an uniform way.

Figure 4:
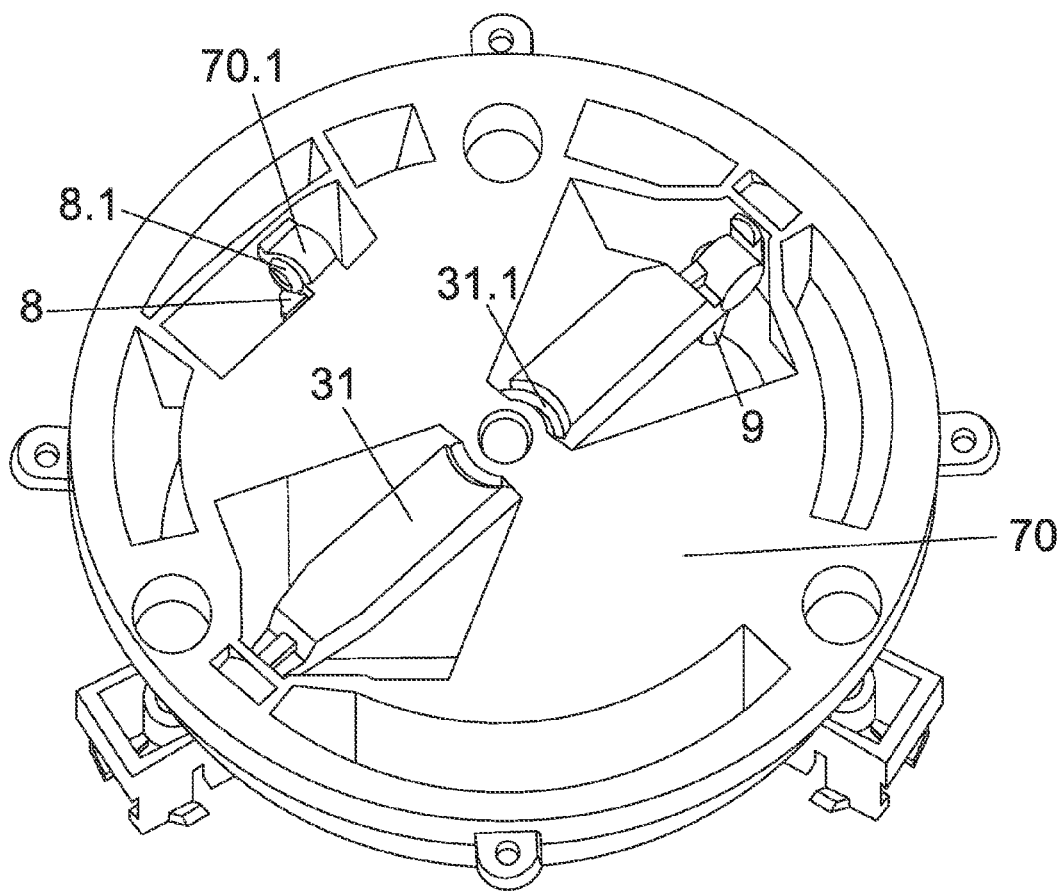
FIG. 4 is a three-point perspective of a second preferred embodiment of the present. invention.

In a second preferred embodiment shown in FIG. 4 the first arm and the mirror frame are a single element (70) adding in this way more rigidity to the mirror support.

In this second embodiment the ball-shaped end (8.1) of the first gear knee (8) attached to the single element (70) by means of a socket (70.1) has an additional degree of freedom with regard to the first embodiment wherein this degree of freedom was associated to the movement of the two perpendicular arms (30, 31) fixed setting up a cross relative to the mirror frame (7).

While the present invention has been described in terms of preferred embodiments in order to facilitate better understanding of the invention, it should be appreciated that the various modifications can be made without departing from the principles of the invention. Therefore, the invention should be understood to include all such modifications within its scope.

The invention claimed is:

1. Mirror support comprising a mirror frame (7) which receives an actuating force coming from two gear knees (8, 9) to adjust the orientation of a mirror wherein the two gear knees (8, 9) are attached to two perpendicular arms (30, 31) fixed to the mirror frame (7) in such a way that the ends (30.1, 30.2, 31.1, 31.2) of the two perpendicular arms (30, 31) are fixed in four equidistant points with regard to the mirror frame (7) setting up a cross.

2. Mirror support according to claim 1 wherein each arm (30, 31) pivots independently about the central point where they cross.

3. Mirror support according to claim 1 wherein each one of the gear knees (8, 9) are attached to first ends (30.1, 31.1) of the two perpendicular arms (30, 31).

4. Mirror support according to claim 2 wherin the central point of the two perpendicular arms (30, 31) is arranged in a ball-and-socket joint (30.3, 31.3) manner wherein the center (30.3) of the first arm (30) is the ball and the center (31.3) of the first arm (30) is the socket.

5. Mirror support according claim 1, wherein one of the perpendicular arms and the mirror frame are a single element (70).

6. Device to adjust the orientation of a mirror that comprises a housing (2) accommodating a first and a second electric motor (3, 4) and a first and a second gear (5, 6) driven by said first and second motor (3, 4) respectively wherein the first and the second gear (5, 6) are part of a first and a second train gear (10, 11) respectively which also include a mirror support of claim 1.

7. Device to adjust the orientation of a mirror according to claim 6 further comprising a mirror support (7) pivot-mounted at the housing (2) in relation to two pivot axles, at which two gear knees (8, 9) are arranged engaging with said train gears (10, 11), a first gear knee (8) engaging with the first train gear (10) to pivot the mirror support (7) around a first pivot axle and a second gear knee (9) engaging with the second train gear (11) to pivot the mirror support (7) around a second pivot axle.

8. Device to adjust the orientation of a mirror according to claim 7 further comprising a motherboard (13) accommodated onto a window (14) of the housing (2) and connected to an input connector which transmit the current to the motherboard (13) which in turn transmit the current to the electric motors (2, 3).

9. Device to adjust the orientation of a mirror according to claim 8 wherein the housing (2) overlays the mechanical and electrical components only allowing the gear knees (8, 9) passing through two holes (12.1) located in the cover (12) to engage with the mirror support (7).

10. Device to adjust the orientation of a mirror according to claim 9 wherein a backplate arranged on the mirror support (7) supports the mirror by means of a heater or an adhesive.

11. Mirror support according to claim 2 wherein each one of the gear knees (8, 9) are attached to first ends (30.1, 31.1) of the two perpendicular arms (30, 31).

12. Mirror support according claim 2, wherein one of the perpendicular arms and the mirror frame are a single element (70).

13. Mirror support according to claim 3, wherein one of the perpendicular arms and the mirror frame are a single element (70).

14. Mirror support according claim 4, wherein one of the perpendicular arms and the mirror frame are a single element (70).

* * * * *